(12) United States Patent
Hatano et al.

(10) Patent No.: US 11,858,060 B2
(45) Date of Patent: Jan. 2, 2024

(54) FRICTION STIR SPOT WELDING DEVICE AND METHOD FOR OPERATING SAME

(71) Applicant: KAWASAKI JUKOGYO KABUSHIKI KAISHA, Kobe (JP)

(72) Inventors: Ryoichi Hatano, Kobe (JP); Shintaro Fukada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 223 days.

(21) Appl. No.: 17/418,875

(22) PCT Filed: Dec. 26, 2019

(86) PCT No.: PCT/JP2019/051216
§ 371 (c)(1),
(2) Date: Jun. 28, 2021

(87) PCT Pub. No.: WO2020/138326
PCT Pub. Date: Jul. 2, 2020

(65) Prior Publication Data
US 2022/0072653 A1    Mar. 10, 2022

(30) Foreign Application Priority Data

Dec. 26, 2018  (JP) ................................. 2018-243328

(51) Int. Cl.
*B23K 20/00*    (2006.01)
*B23K 20/12*    (2006.01)

(52) U.S. Cl.
CPC ........ *B23K 20/1245* (2013.01); *B23K 20/123* (2013.01)

(58) Field of Classification Search
CPC ............ B23K 20/1255; B23K 20/1265; B23K 20/1245; B23K 20/125; B23K 20/123; B23K 20/22; B23K 20/002; B23K 20/12; B23K 20/122; B23K 20/1225; B23K 20/124; B23K 20/126; B23K 20/127; B23K 20/24; B23K 2101/045; B23K 2101/18; B23K 2103/00; B23K 2103/04; B23K 2103/10; B23K 26/36
See application file for complete search history.

(56) References Cited

U.S. PATENT DOCUMENTS

2017/0304935 A1* 10/2017 Okada ................ B23K 20/1265
2017/0341176 A1    11/2017 Okada et al.
2019/0070692 A1*  3/2019 Haruna ................ B23K 20/22
(Continued)

FOREIGN PATENT DOCUMENTS

CN    108778603 A    11/2018
JP    6182280 B2     8/2017

*Primary Examiner* — Erin B Saad
(74) *Attorney, Agent, or Firm* — Oliff PLC

(57) ABSTRACT

A friction stir spot welder includes a controller configured to: drive a rotary actuator and an advancement/withdrawal actuator to cause a pin to press workpieces while rotating; after the pressing, drive the rotary actuator and the advancement/withdrawal actuator to cause the pin and a shoulder to press the workpieces while rotating; and after the pressing, drive the rotary actuator and the advancement/withdrawal actuator to cause the pin and/or the shoulder to plunge into a weld region of the workpieces while rotating and stir the weld region to weld the workpieces together.

10 Claims, 9 Drawing Sheets

(56) References Cited

U.S. PATENT DOCUMENTS

| | | | |
|---|---|---|---|
| 2020/0276666 A1* | 9/2020 | Haruna | B23K 20/127 |
| 2020/0282491 A1* | 9/2020 | Haruna | B23K 20/1265 |
| 2022/0009024 A1* | 1/2022 | Yoshikawa | B23K 20/1245 |
| 2022/0143739 A1* | 5/2022 | Hatano | B23K 20/125 |

* cited by examiner

FRICTION STIR SPOT WELDING DEVICE AND METHOD FOR OPERATING SAME

TECHNICAL FIELD

The present invention relates to a friction stir spot welder and a method of operating the welder.

BACKGROUND ART

Resistance spot welding or rivet joining has been traditionally used to join metal parts together in transportation machines such as automobiles, railcars, and aircrafts. In rivet joining for machines such as aircrafts which are used in harsh environments, a sealant (sealing material) needs to be applied between the workpieces to be joined in order to ensure corrosion resistance.

A friction stir spot welder is known which is capable of achieving high weld quality when used to weld workpieces in the presence of a sealant applied between the workpieces (see Patent Literature 1, for example).

CITATION LIST

Patent Literature

PTL 1: Japanese Patent No. 6182280

SUMMARY OF INVENTION

Technical Problem

The present inventors have found a novel friction stir spot welder and an operating method thereof which are capable of achieving high weld quality when used to weld workpieces in the presence of a sealant applied between the workpieces, and thus arrived at the present invention. This welder is different from the friction stir spot welder as disclosed in Patent Literature 1.

An object of the present invention is to provide a friction stir spot welder and an operating method thereof which are capable of achieving high weld quality when used in double-acting friction stir spot welding to weld workpieces in the presence of a sealant applied between the workpieces.

Solution to Problem

In order to achieve the above object, a friction stir spot welder according to the present invention is adapted to weld workpieces through softening induced by friction heat, the workpieces including first and second workpieces stacked in the presence of a sealant applied to a region of contact between the first and second workpieces, the friction stir spot welder including: a pin in the form of a solid circular cylinder; a shoulder in the form of a hollow circular cylinder, the shoulder having an interior in which the pin is inserted; a rotary actuator that rotates the pin and the shoulder about an axis coinciding with a central axis of the pin; a clamp in the form of a hollow circular cylinder, the clamp having an interior in which the pin and the shoulder are inserted; an advancement/withdrawal actuator that advances and withdraws the pin, the shoulder, and the clamp along the axis; and a controller, the controller being configured to: (B) drive the rotary actuator and the advancement/withdrawal actuator to cause the pin to press the workpieces while rotating; (C) after performing the pressing (B) for a first predetermined time, drive the rotary actuator and the advancement/withdrawal actuator to cause the pin and the shoulder to press the workpieces while rotating; and (D) after performing the pressing (C) for a second predetermined time, drive the rotary actuator and the advancement/withdrawal actuator to cause the pin and/or the shoulder to plunge into a weld region of the workpieces while rotating and stir the weld region to weld the workpieces together.

Thus, when workpieces are welded in the presence of a sealant applied between the workpieces, the sealant can be pushed out of the region where the workpieces are welded. The pressing of the weld region by the rotating pin and/or shoulder generates friction heat. Transfer of the friction heat leads to melting and viscosity decrease of the sealant, facilitating pushing out of the sealant.

As such, entry (mixing) of the sealant into a plastic flow portion of the workpieces can be reduced, and consequently high weld quality can be achieved.

A method of operating a friction stir spot welder according to the present invention is for operation of a friction stir spot welder adapted to weld workpieces through softening induced by friction heat, the workpieces including first and second workpieces stacked in the presence of a sealant applied to a region of contact between the first and second workpieces, wherein the friction stir spot welder includes: a pin in the form of a solid circular cylinder; a shoulder in the form of a hollow circular cylinder, the shoulder having an interior in which the pin is inserted; a rotary actuator that rotates the pin and the shoulder about an axis coinciding with a central axis of the pin; a clamp in the form of a hollow circular cylinder, the clamp having an interior in which the pin and the shoulder are inserted; and an advancement/withdrawal actuator that advances and withdraws the pin, the shoulder, and the clamp along the axis, the method including: (B) driving the rotary actuator and the advancement/withdrawal actuator to cause the pin to press the workpieces while rotating; (C) after performing the pressing (B) for a first predetermined time, driving the rotary actuator and the advancement/withdrawal actuator to cause the pin and the shoulder to press the workpieces while rotating; and (D) after performing the pressing (C) for a second predetermined time, driving the rotary actuator and the advancement/withdrawal actuator to cause the pin and/or the shoulder to plunge into a weld region of the workpieces while rotating and stir the weld region to weld the workpieces together.

Thus, when workpieces are welded in the presence of a sealant applied between the workpieces, the sealant can be pushed out of the region where the workpieces are welded. The pressing of the weld region by the rotating pin and/or shoulder generates friction heat. Transfer of the friction heat leads to melting and viscosity decrease of the sealant, facilitating pushing out of the sealant.

As such, entry (mixing) of the sealant into a plastic flow portion of the workpieces can be reduced, and consequently high weld quality can be achieved.

The above and further objects, features and advantages of the present invention will be more apparent from the following detailed description of preferred embodiments with reference to the accompanying drawings.

Advantageous Effects of Invention

The friction stir spot welder and operating method thereof according to the present invention are capable of achieving high weld quality even when used to weld workpieces in the presence of a sealant applied between the workpieces.

DESCRIPTION OF EMBODIMENTS

Figure 1:
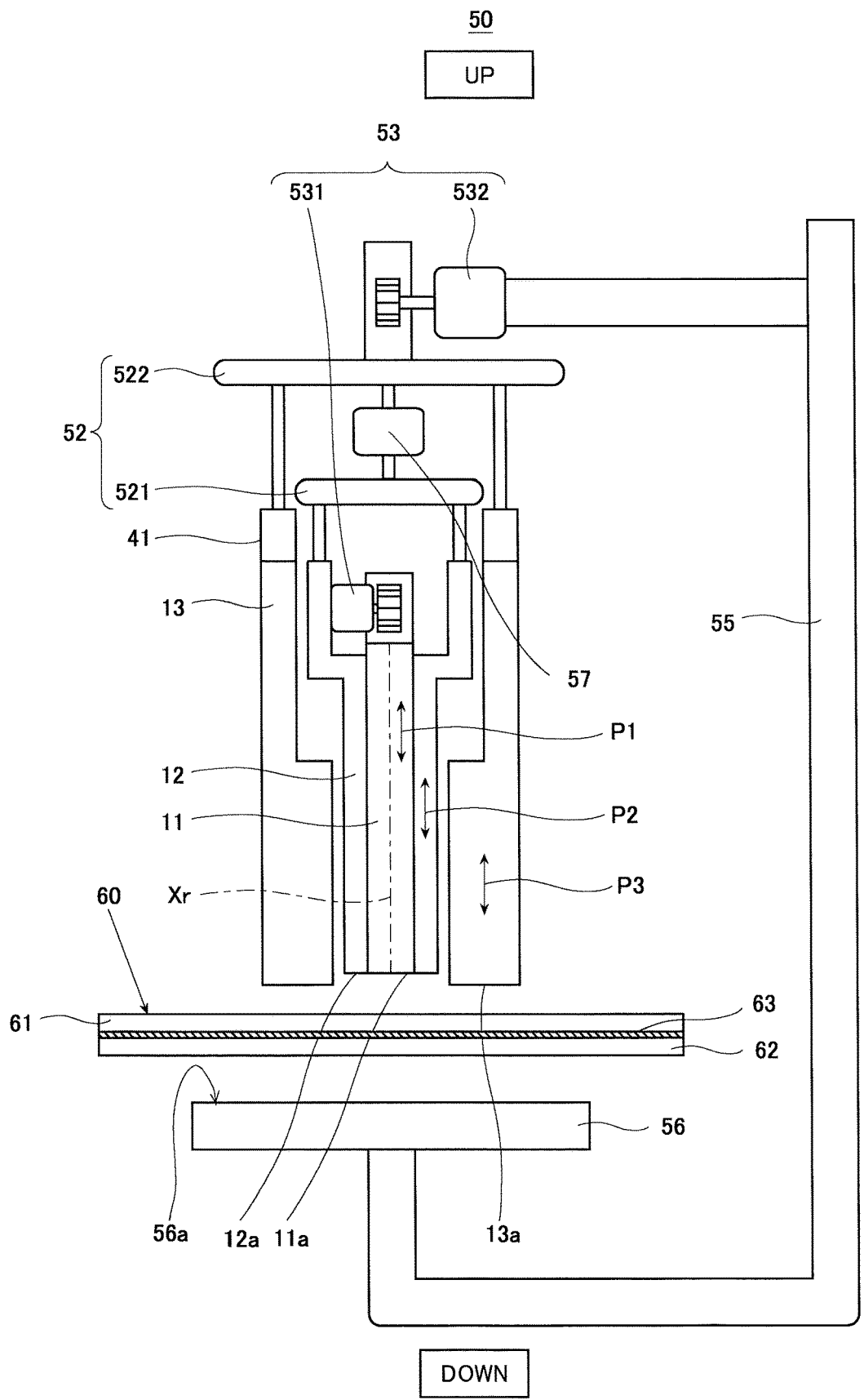
FIG. 1 is a schematic diagram illustrating the general configuration of a friction stir spot welder according to Embodiment 1.

Hereinafter, preferred embodiments of the present invention will be described with reference to the drawings. The same or equivalent elements are denoted by the same reference signs throughout the drawings, and repeated descriptions of these elements will not be given. In the drawings, some elements may be selectively shown to illustrate the present invention while the other elements are omitted from the figure. The present invention is not limited to the embodiments described below.

Embodiment 1

A friction stir spot welder according to Embodiment 1 is adapted to weld workpieces through softening induced by friction heat, the workpieces including first and second workpieces stacked in the presence of a sealant applied to a region of contact between the first and second workpieces, the friction stir spot welder including: a pin in the form of a solid circular cylinder; a shoulder in the form of a hollow circular cylinder, the shoulder having an interior in which the pin is inserted; a rotary actuator that rotates the pin and the shoulder about an axis coinciding with a central axis of the pin; a clamp in the form of a hollow circular cylinder, the clamp having an interior in which the pin and the shoulder are inserted; an advancement/withdrawal actuator that advances and withdraws the pin, the shoulder, and the clamp along the axis; and a controller, the controller being configured to: (B) drive the rotary actuator and the advancement/withdrawal actuator to cause the pin to press the workpieces while rotating; (C) after performing the pressing (B) for a first predetermined time, drive the rotary actuator and the advancement/withdrawal actuator to cause the pin and the shoulder to press the workpieces while rotating; and (D) after performing the pressing (C) for a second predetermined time, drive the rotary actuator and the advancement/withdrawal actuator to cause the pin and/or the shoulder to plunge into a weld region of the workpieces while rotating and stir the weld region to weld the workpieces together.

In the friction stir spot welder according to Embodiment 1, the controller may be configured to, in the plunging (D): (D3) drive the rotary actuator and the advancement/withdrawal actuator to cause the shoulder to plunge into the weld region while rotating; and (D4) after the plunging (D3), drive the rotary actuator and the advancement/withdrawal actuator to retract the shoulder out of the weld region and cause the pin to plunge into the weld region while rotating.

In the friction stir spot welder according to Embodiment 1, the controller may be configured to, in the pressing (B), control the advancement/withdrawal actuator to place a distal end of the pin on an upper surface of the stack of the workpieces.

In the friction stir spot welder according to Embodiment 1, the controller may be configured to, in the pressing (C), control the advancement/withdrawal actuator to place respective distal ends of the pin and the shoulder on an upper surface of the stack of the workpieces.

An example of the friction stir spot welder according to Embodiment 1 will now be described in detail with reference to the drawings.

Configuration of Friction Stir Spot Welder

FIG. 1 is a schematic diagram illustrating the general configuration of the friction stir spot welder according to Embodiment 1. The up-down direction indicated in FIG. 1 is that defined with respect to the friction stir spot welder.

As shown in FIG. 1, the friction stir spot welder 50 according to Embodiment 1 includes a pin 11, a shoulder 12, a tool holder 52, an advancement/withdrawal actuator 53, a clamp 13, a backing support 55, a backing 56, and a rotary actuator 57.

The pin 11, shoulder 12, tool holder 52, advancement/withdrawal actuator 53, clamp 13, and rotary actuator 57 are mounted to an upper end portion of the backing support 55 embodied in the form of a C-gun (C-frame). The backing 56 is mounted to a lower end portion of the backing support 55. The pin 11, shoulder 12, clamp 13, and backing 56 are mounted to the backing support 55 in such a manner that the assembly of the pin 11, shoulder 12, and clamp 13 is opposed to the backing 56. Workpieces 60 to be welded are placed between the assembly of the pin 11, shoulder 12, and clamp 13 and the backing 56.

The pin 11, shoulder 12, and clamp 13 are secured to the tool holder 52 which is made up of a rotary tool holder 521 and a clamp holder 522. Specifically, the pin 11 and shoulder 12 are secured to the rotary tool holder 521, and the clamp 13 is secured to the clamp holder 522 with a clamp actuator 41 interposed therebetween. The rotary tool holder 521 is supported by the clamp holder 522 with the rotary actuator 57 interposed therebetween. The clamp actuator 41 is embodied in the form of a spring mechanism.

The pin 11, shoulder 12, and clamp 13 are advanced and withdrawn in the up-down direction by the advancement/withdrawal actuator 53 which is made up of a pin actuator 531 and a shoulder actuator 532.

The pin 11 is in the form of a solid circular cylinder and supported by the rotary tool holder 521, although the details of this supporting are not shown in FIG. 1. The pin 11 is driven by the rotary actuator 57 to rotate about an axis Xr (rotational axis) coinciding with the central axis of the pin 11, and is driven by the pin actuator 531 to make an advancement movement or a withdrawal movement in the direction indicated by the arrow P1, namely in the direction of the axis Xr (the up-down direction in FIG. 1). The pin actuator 531 may be embodied in any form capable of allowing the pin 11 to exert a welding pressure. For example, a mechanism employing gas pressure, hydraulic pressure, or a servomotor can be suitably used as the pin actuator 531.

The shoulder 12 is in the form of a hollow circular cylinder with a hollow interior and supported by the rotary tool holder 521. The pin 11 is inserted in the hollow interior of the shoulder 12. In other words, the shoulder 12 is disposed to surround the outer circumferential surface of the pin 11.

The shoulder 12 is driven by the rotary actuator 57 to rotate about the axis Xr about which the pin 11 also rotates, and is driven by the shoulder actuator 532 to make an advancement movement or a withdrawal movement in the direction indicated by the arrow P2, namely in the direction of the axis Xr. The shoulder actuator 532 may be embodied in any form capable of allowing the shoulder 12 to exert a welding pressure. For example, a mechanism employing gas pressure, hydraulic pressure, or a servomotor can be suitably used as the shoulder actuator 532.

In the present embodiment, as described above, the pin 11 and shoulder 12 (rotary tools) are both supported by the same rotary tool holder 521, and driven by the rotary actuator 57 to rotate together about the axis Xr. Additionally, the pin 11 and shoulder 12 are respectively driven by the pin actuator 531 and shoulder actuator 532 to make an advancement movement or a withdrawal movement in the direction of the axis Xr. Although in Embodiment 1 the pin 11 is capable of making an advancement movement or a withdrawal movement alone or in conjunction with an advancement movement or a withdrawal movement of the shoulder 12, the pin 11 and shoulder 12 may be advanceable and withdrawable independently of each other.

The clamp 13, like the shoulder 12, is in the form of a hollow circular cylinder with a hollow interior and disposed to have its central axis coinciding with the axis Xr. The shoulder 12 is inserted in the hollow interior of the clamp 13.

Thus, the shoulder 12 in the form of a hollow circular cylinder is disposed to surround the outer circumferential surface of the pin 11, and the clamp 13 in the form of a hollow circular cylinder is disposed to surround the outer circumferential surface of the shoulder 12. In other words, the clamp 13, shoulder 12, and pin 11 are coaxially arranged to form a nested structure.

The clamp 13 presses one surface (front surface) of the stack of the workpieces 60. In Embodiment 1, as previously stated, the clamp 13 is supported by the clamp holder 522 with the clamp actuator 41 interposed therebetween. The clamp actuator 41 biases the clamp 13 toward the backing 56. The clamp 13 (and the clamp actuator and holder 41 and 522) is driven by the shoulder actuator 532 to make an advancement movement or a withdrawal movement in the direction indicated by the arrow P3 (which is the same as the directions indicated by the arrows P1 and P2).

Although in Embodiment 1 the clamp actuator 41 is embodied in the form of a spring mechanism, the clamp actuator 41 is not limited to this form. The clamp actuator 41 may be embodied in any form capable of biasing the clamp 13 or allowing the clamp 13 to exert a welding pressure. For example, a mechanism employing gas pressure, hydraulic pressure, or a servomotor can be suitably used as the claim actuator 41.

The pin 11, shoulder 12, and clamp 13 have distal end surfaces 11a, 12a, and 13a. The pin 11, shoulder 12, and clamp 13 are driven by the advancement/withdrawal actuator 53 to make an advancement movement, so that the distal end surfaces 11a, 12a, and 13a come into contact with the front surface of the stack of the workpieces 60 (the weld region of the workpieces 60) and press the workpieces 60.

In Embodiment 1, the backing 56 has a flat surface (support surface 56a) adapted to contact with the other surface (back surface) of the stack of the workpieces 60 which are in the form of a flat plate, and supports the workpieces 60 by the support surface 56a. The backing 56 is not limited to a particular form and may be embodied in any form capable of supporting the workpieces 60 in a manner appropriate for the friction stir spot welding. The backing 56 may be removable from the backing support 55 and replaceable with another backing 56; that is, backings 56 with different shapes may be prepared, and the backing 56 used may be changed depending on the type of the workpieces 60.

The details of the forms of the pin 11, shoulder 12, tool holder 52, advancement/withdrawal actuator 53, clamp 13, backing support 55, and rotary actuator 57 in Embodiment 1 are not limited to those described above, and various forms well known in the field of friction stir welding can be suitably employed. For example, the pin actuator 531 and shoulder actuator 532 may be embodied in the form of a motor or gear mechanism well known in the field of friction stir welding.

Although in Embodiment 1 the backing support 55 is embodied in the form of a C-gun, the backing support 55 is not limited to this form. The backing support 55 may be embodied in any form capable of supporting the pin 11, shoulder 12, and clamp 13 in a manner permitting advancement and withdrawal movements of the pin 11, shoulder 12, and clamp 13 and capable of supporting the backing 56 in a position where the backing 56 is opposed to the pin 11, shoulder 12, and clamp 13.

Further, the friction stir spot welder 50 according to Embodiment 1 is designed to be mounted on a robotic device for friction stir spot welding (this robot is not shown in the drawings). Specifically, the backing support 55 is mounted on the distal end of the arm of the robotic device. Thus, the backing support 55 may be considered a component of the robotic device for friction stir spot welding. The robotic device for friction stir spot welding which includes the backing support 55 and arm is not limited to a particular form, and various forms of robots such as articulated robots which are well known in the field of friction stir welding can be suitably employed.

The friction stir spot welder 50 (including the backing support 55) is not limited to being applied to robotic devices for friction stir spot welding, but can be suitably applied also to well known processing tools such as NC machine tools, large-sized C-frames, and automatic riveters.

The friction stir spot welder 50 according to Embodiment 1 may be embodied in a form where two or more robots place the backing 56 of the friction stir spot welder 50 in face-to-face relationship with the other elements of the friction stir spot welder 50. Further, the friction stir spot welder 50 may be embodied in a form where the workpieces 60 are hand-held workpieces or where a robot is used as a positioner for the workpieces 60, provided that friction stir spot welding of the workpieces 60 can be performed stably.

[Control Configuration of Friction Stir Spot Welder]

Hereinafter, the control configuration of the friction stir spot welder 50 according to Embodiment 1 will be described in detail with reference to FIG. 2.

Figure 2:
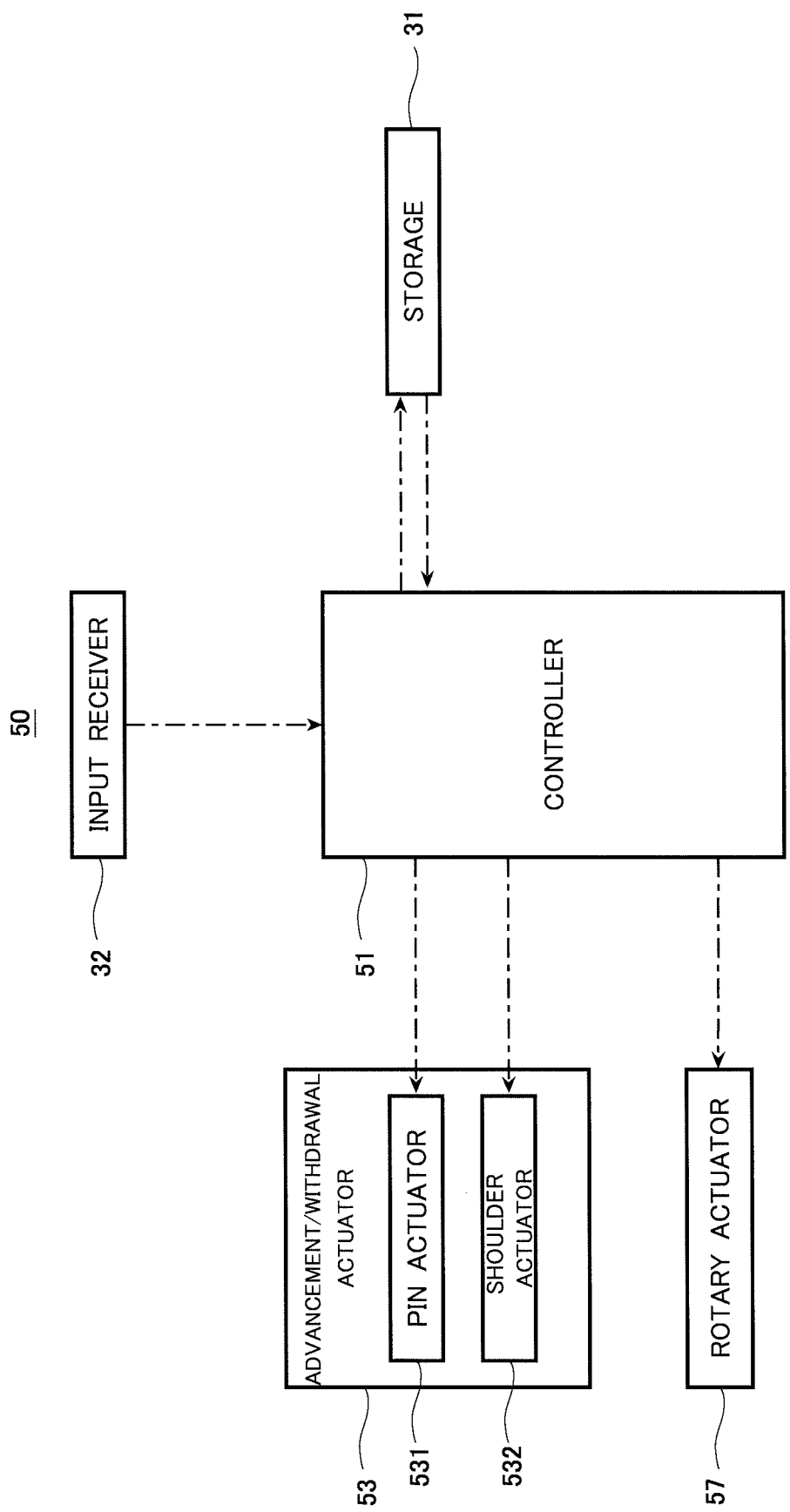
FIG. 2 is a block diagram schematically illustrating the control configuration of the friction stir spot welder of FIG. 1.

FIG. 2 is a block diagram schematically illustrating the control configuration of the friction stir spot welder of FIG. 1.

As shown in FIG. 2, the friction stir spot welder 50 includes a controller 51, a storage 31, and an input receiver 32.

The storage 31 retrievably stores various kinds of data. The storage 31 is embodied in the form of a well known storage device such as a memory or hard disk. The storage 31 need not consist of a single device, but may be constituted by a plurality of storage devices (such as by a random access memory and a hard disk drive). When, for example, the controller 51 is embodied in the form of a microcomputer, at least part of the storage 31 may be embodied in the form of an internal memory of the microcomputer, or the storage 31 may be embodied in the form of a memory independent of the microcomputer.

It should be appreciated that the storage 31 may store data in a manner permitting retrieval of the data by an entity other than the controller 51 or may be a writable storage into which the controller 51 or any other entity can write data.

The input receiver 32 is a device for enabling input of various parameters related to the control of friction stir spot welding and other data to the controller 51, and is embodied in the form of a well known device such as a keyboard, a touch panel, or a set of button switches. In Embodiment 1, at least data regarding the factors related to the welding of the workpieces 60, such as the thickness and material of the workpieces 60, can be input through the input receiver 32.

The controller 51 is configured to control the components (devices) constituting the friction stir spot welder 50. Specifically, the controller 51 controls the pin actuator 531 and shoulder actuator 532 constituting the advancement/withdrawal actuator 53, and further controls the rotary actuator 57. Thus, switching between advancement and withdrawal movements of the pin 11, shoulder 12, and clamp 13 can be controlled, and the distal end locations, movement speeds, and movement directions of the pin 11, shoulder 12, and clamp 13 can be controlled during advancement and withdrawal movements. Additionally, the pressing forces with which the pin 11, shoulder 12, and clamp 13 press the workpieces 60 can be controlled. The rotational speeds of the pin 11 and shoulder 12 can also be controlled.

The controller 51 is not limited to a particular form. In Embodiment 1, the controller 51 is embodied in the form of a microcomputer and includes a CPU. The controller 51 is configured such that the CPU retrieves and executes a predetermined control program stored in the storage 31 and thereby performs processing related to the operation of the advancement/withdrawal actuator 53 and rotary actuator 57.

The controller 51 need not consist of a single controller, but may be constituted by a set of controllers cooperative with each other to carry out the control of the friction stir spot welder 50.

Operation (Operating Method) of Friction Stir Spot Welder

Hereinafter, the operation of the friction stir spot welder 50 according to Embodiment 1 will be described in detail with reference to FIGS. 3, 4A, 4B, and 4C. FIGS. 4A, 4B, and 4C depict an example where the workpieces 60 used are two metal plates 61 and 62, a sealant 63 is applied to the upper surface of the metal plate 62 (the surface to be brought into contact with the metal plate 61), and the metal plates 61 and 62 are stacked and joined by spot welding.

Figure 3:
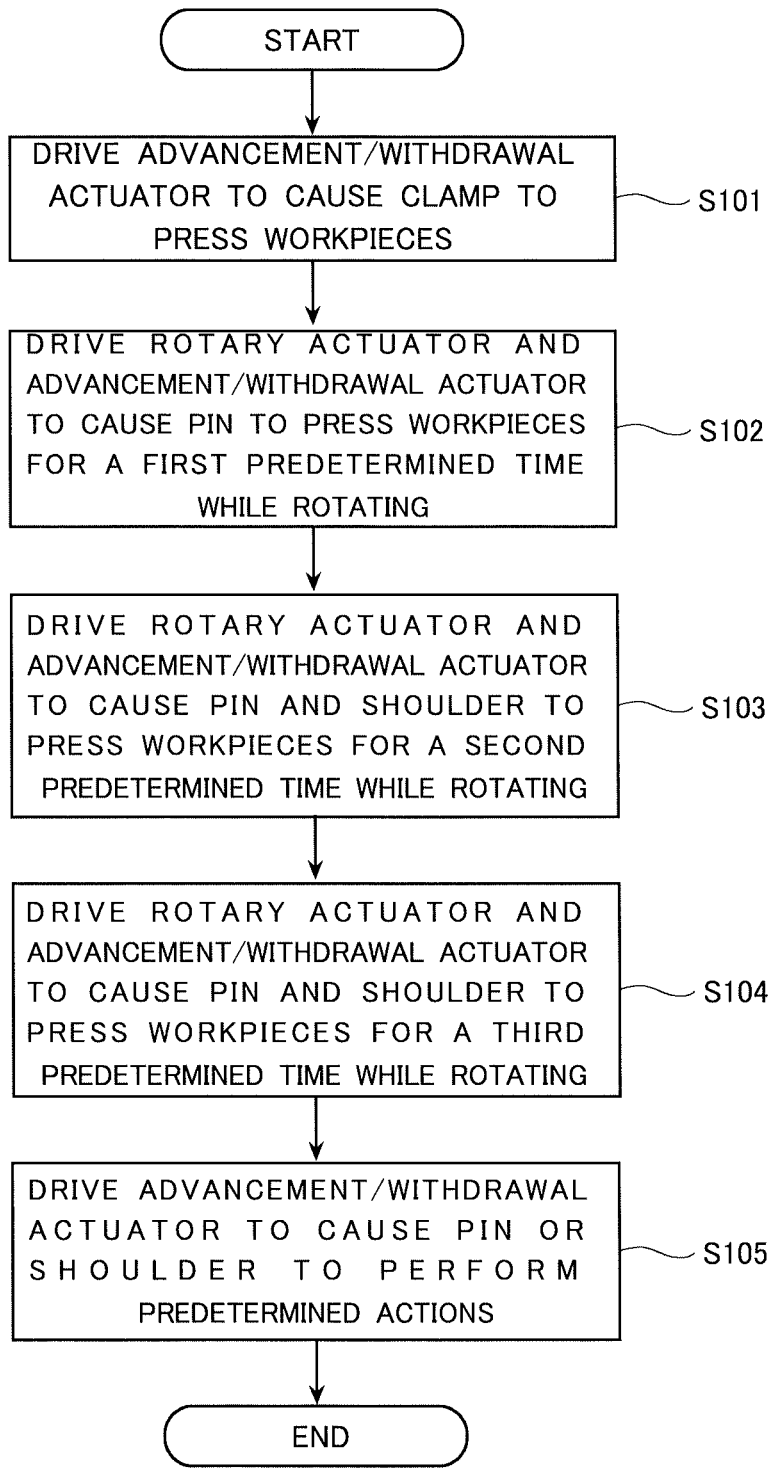
FIG. 3 is a flowchart illustrating an example of the operation of the friction stir spot welder according to Embodiment 1.
Figure 4A:
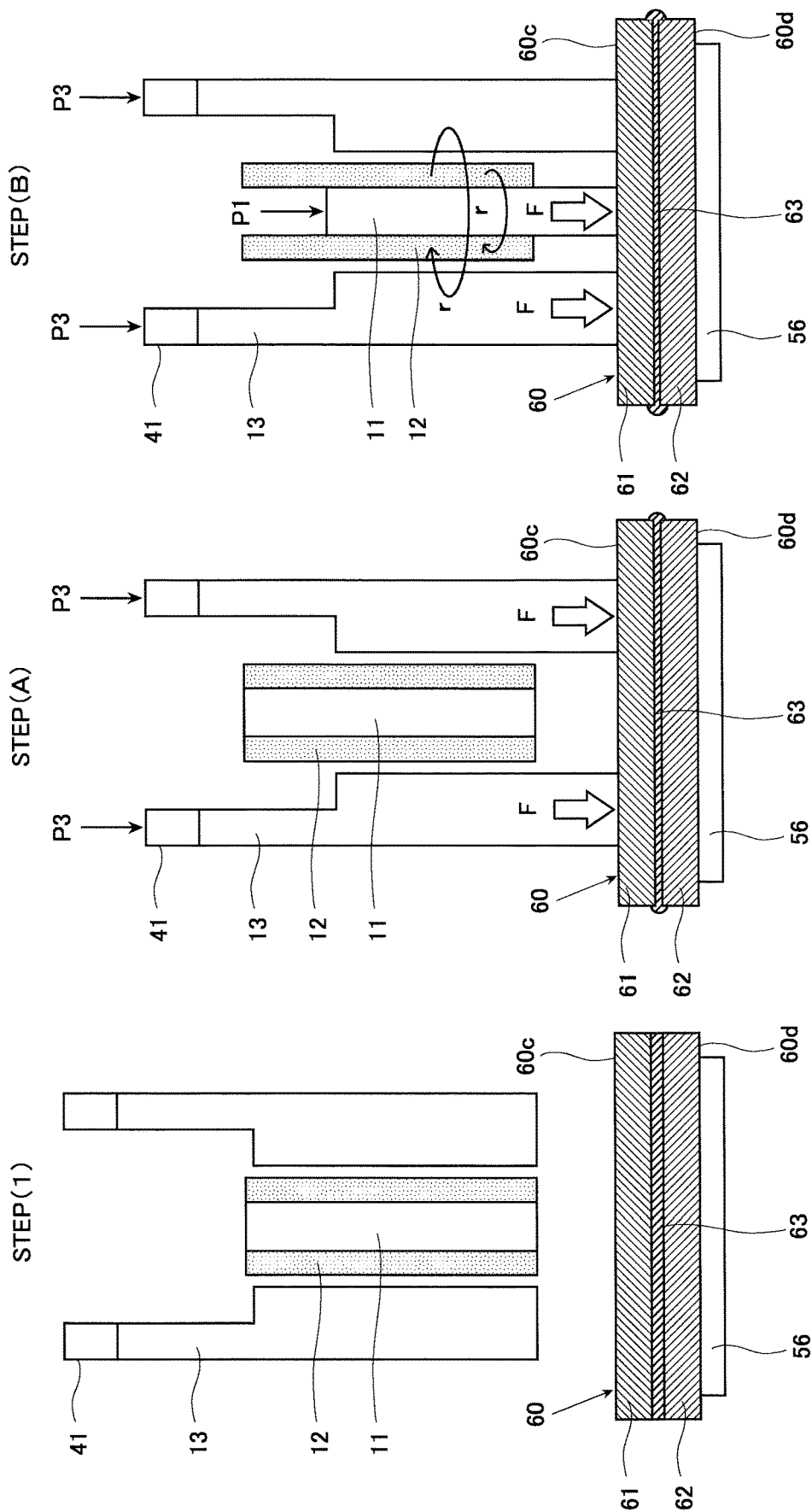
FIG. 4A is a process diagram schematically illustrating examples of the steps of friction stir spot welding performed by the friction stir spot welder of FIG. 1.
Figure 4B:
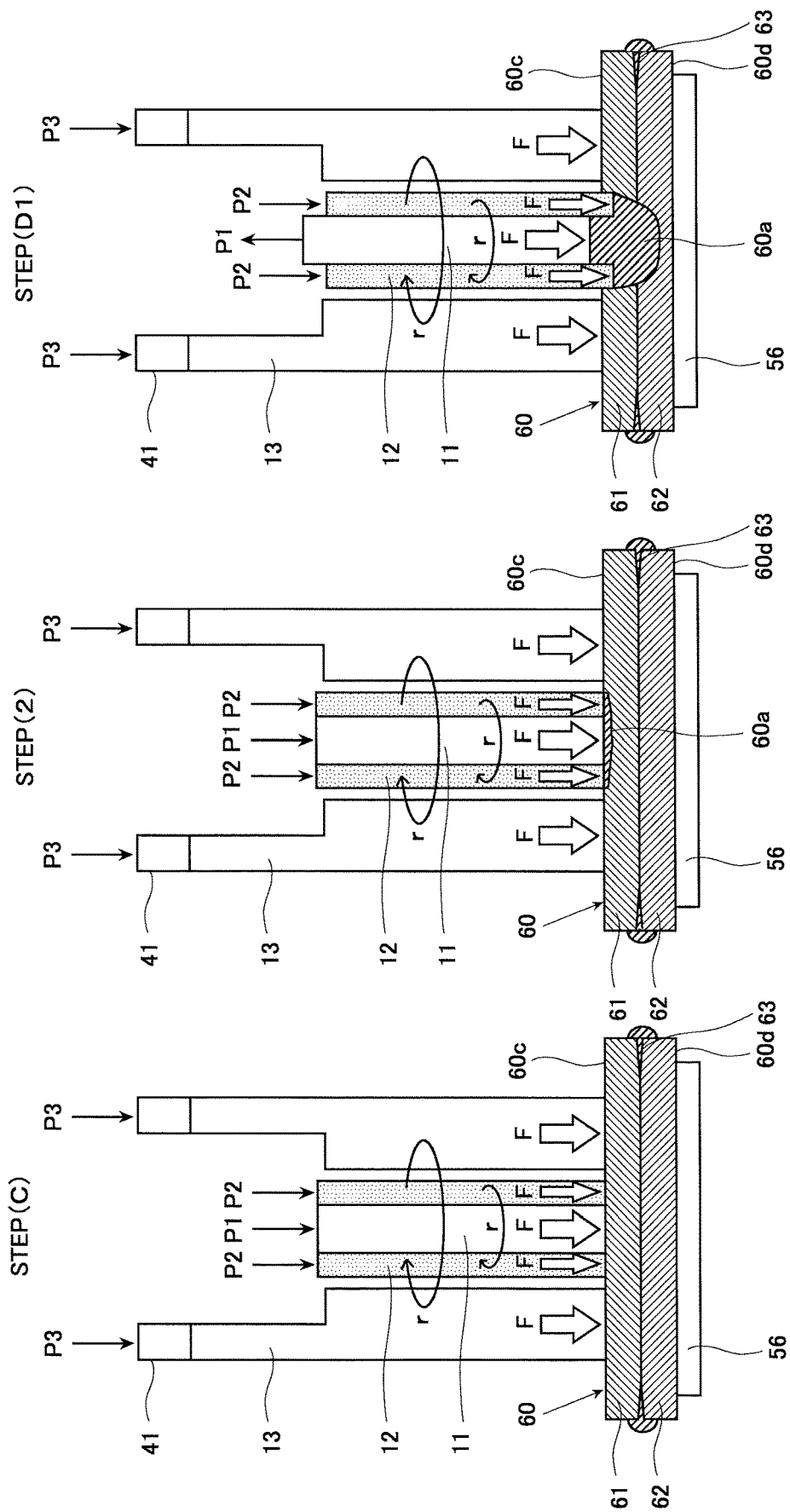
FIG. 4B is a process diagram schematically illustrating examples of the steps of the friction stir spot welding performed by the friction stir spot welder of FIG. 1.
Figure 4C:
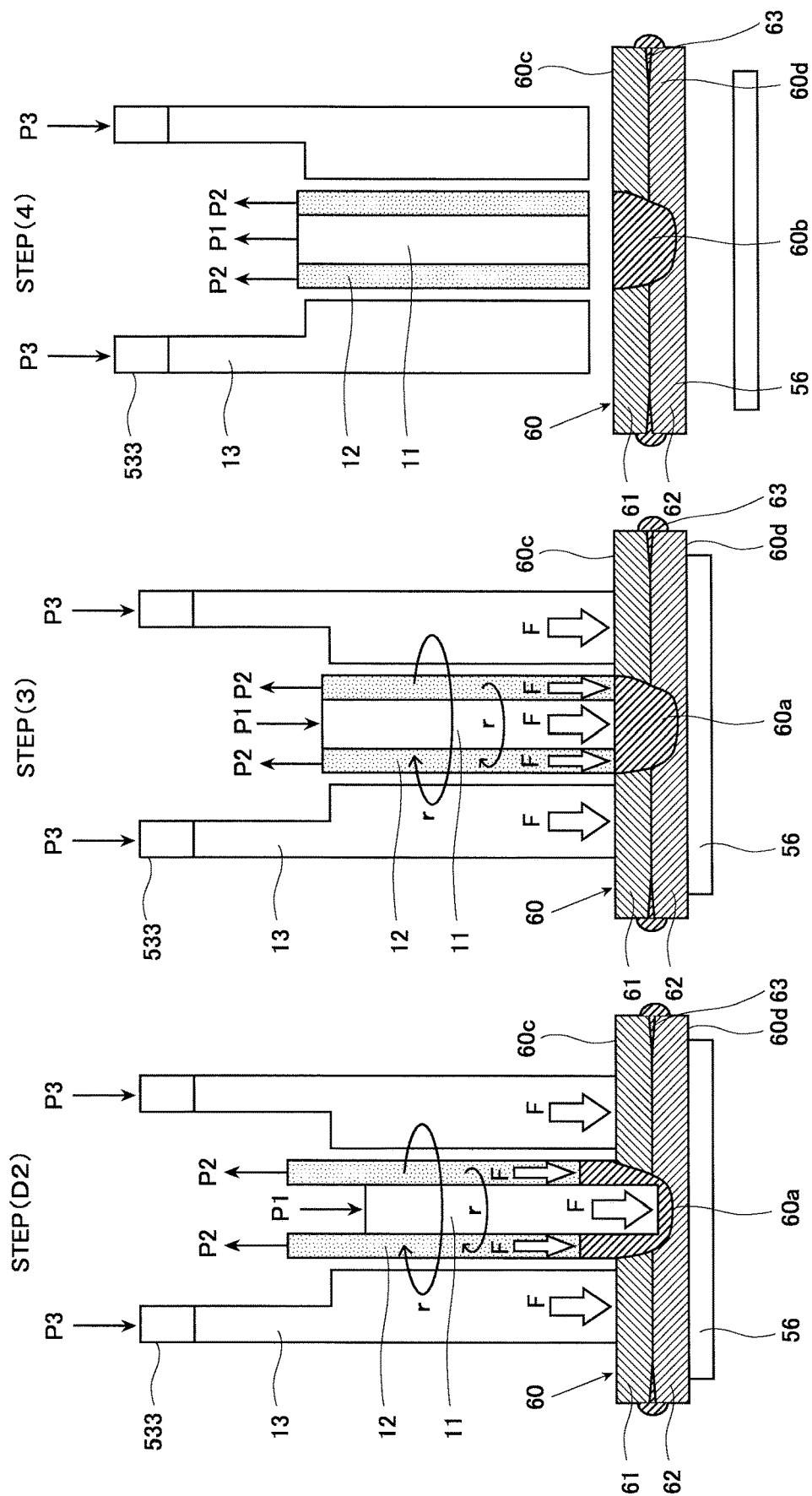
FIG. 4C is a process diagram schematically illustrating examples of the steps of the friction stir spot welding performed by the friction stir spot welder of FIG. 1.

FIG. 3 is a flowchart illustrating an example of the operation of the friction stir spot welder according to Embodiment 1. FIGS. 4A, 4B, and 4C are process diagrams schematically illustrating examples of the steps of friction stir spot welding performed by the friction stir spot welder of FIG. 1.

In FIGS. 4A, 4B, and 4C, some parts of the friction stir spot welder are omitted. The arrows r indicate the rotational directions of the pin 11 and shoulder 12, and the block arrows F indicate the directions of the forces exerted on the metal plates 61 and 62. Although a force is exerted on the metal plates 61 and 62 also from the backing 56, the force from the backing 56 is omitted in FIGS. 4A, 4B, and 4C for convenience of illustration. To clearly distinguish between the pin 11 and the clamp 13, the shoulder 12 is shaded.

First, as shown in FIG. 4A, the metal plate (second workpiece) 62 is placed on the upper surface of the backing 56, and the sealant 63 is applied to the metal plate 62. The sealant 63 may be a sealing material or an adhesive. The sealant 63 used may be, for example, a natural rubber, a synthetic rubber such as a polysulfide synthetic rubber, silicone rubber, or fluorine rubber, or a synthetic resin such as a tetrafluoroethylene rubber resin. Next, the metal plate (first workpiece) 61 is placed on the upper surface of the metal plate 62 so that the sealant 63 is sandwiched between the plates (step (1)).

Subsequently, the controller 51 carries out a preliminary operation (operation for pushing out part of the sealant 63). Specifically, as shown in FIGS. 3 and 4A, the controller 51 drives the advancement/withdrawal actuator 53 to cause the clamp 13 to press the front surface 60c of the stack of the workpieces 60 with a predetermined pressing force (step S101; step (A)). The pressing force of the clamp 13 can be freely set and is predetermined by means such as experimentation. The pressing force may be, for example, from 2000 to 15000 N, and is set to a suitable level according to the inner and outer diameters of the clamp 13 and the thickness of the workpieces 60.

Under the action of the pressing force of the clamp 13, part of the sealant 63 comes out of the periphery of the stack of the workpieces 60.

Next, the controller 51 drives the rotary actuator 57 and advancement/withdrawal actuator 53 (pin actuator 531) to cause the pin 11 to press the front surface 60c of the stack of the workpieces 60 (the upper surface of the metal plate 61) with a first pressing force P1 for a first predetermined time while rotating (step S102; step (B)).

The first pressing force can be freely set and is predetermined by means such as experimentation. The first pressing force may be, for example, from 2000 to 15000 N, and is set to a suitable level according to the diameter of the pin 11 and the thickness of the workpieces 60. The rotational speed of the pin 11 is also predetermined and may be, for example, from 500 to 3000 rpm. The first predetermined time is also predetermined by means such as experimentation and may be, for example, from 1 to 10 seconds.

Although in Embodiment 1 the rotary actuator 57 is adapted to rotate the pin 11 and shoulder 12 together, the rotary actuator 57 may be adapted to rotate the pin 11 and shoulder 12 individually.

During the above step, the pin 11 and backing 56 sandwich the metal plate 61, sealant 63, and metal plate 62. In this state, the pin 11 presses the front surface 60c of the stack of the workpieces 60 while rotating, so that friction heat is generated between the distal end surface 11a of the pin 11 and the workpieces 60. Transfer of the generated friction heat leads to heating of that portion (and its vicinity) of the sealant 63 which overlaps the distal end surface 11a of the pin 11 when viewed in the vertical direction, thus decreasing the viscosity of the overlapping portion and its vicinity of the sealant 63.

In consequence, the portion (and its vicinity) of the sealant 63 which overlaps the distal end surface 11a of the pin 11 when viewed in the vertical direction is pushed outward from the initial location, and part of the sealant 63 comes out of the periphery of the stack of the workpieces 60.

Subsequently, the controller 51 drives the rotary actuator 57 and advancement/withdrawal actuator 53 to cause the pin 11 and shoulder 12 to press the front surface 60c of the stack of the workpieces 60 with a second pressing force for a second predetermined time while rotating (step S103; step (C)).

Specifically, the controller 51 drives the shoulder actuator 532 to cause the shoulder 12 to press the front surface 60c of the stack of the workpieces 60 while rotating. During this step, the controller 51 controls the pin actuator 531 to cause the distal end surface 11a of the pin 11 to be on the front surface 60c of the stack of the workpieces 60.

The second pressing force can be freely set and is predetermined by means such as experimentation. The second pressing force may be, for example, from 2000 to 15000 N, and is set to a suitable level according to the inner and outer diameters of the shoulder 12 and the thickness of the workpieces 60. The rotational speed of the shoulder 12 is also predetermined and may be, for example, from 500 to 3000 rpm. The second predetermined time is also predetermined by means such as experimentation and may be, for example, from 1 to 10 seconds. The second pressing force may be set greater than the first pressing force.

During the above step, the assembly of the pin 11 and shoulder 12 and the backing 56 sandwich the metal plate 61, sealant 63, and metal plate 62. In this state, the pin 11 and shoulder 12 press the front surface 60c of the stack of the workpieces 60 while rotating, so that friction heat is generated between the workpieces 60 and the distal end surfaces 11a and 12a of the pin 11 and shoulder 12. Transfer of the generated friction heat leads to heating of that portion (and its vicinity) of the sealant 63 which overlaps the distal end surfaces 11a and 12a of the pin 11 and shoulder 12 when viewed in the vertical direction, thus decreasing the viscosity of the overlapping portion and its vicinity of the sealant 63.

In consequence, the portion (and its vicinity) of the sealant 63 which overlaps the distal end surfaces 11a and 12a of the pin 11 and shoulder 12 when viewed in the vertical direction is pushed outward from the initial location, and part of the sealant 63 comes out of the periphery of the stack of the workpieces 60. The part of the sealant 63 remains around the periphery of the stack of the workpieces 60 and seals the welded surfaces of the workpieces 60.

Subsequently, the controller 51 drives the rotary actuator 57 and advancement/withdrawal actuator 53 to cause the pin 11 and shoulder 12 to press the front surface 60c of the stack of the workpieces 60 with a third pressing force for a third predetermined time while rotating (step (2); step S104).

The third pressing force can be freely set and is predetermined by means such as experimentation. The third pressing force may be, for example, from 2000 to 15000 N, and is set to a suitable level according to the diameter of the pin 11, the inner and outer diameters of the shoulder 12, and the thickness of the workpieces 60. The rotational speed of the pin 11 and shoulder 12 is also predetermined and may be, for example, from 500 to 3000 rpm. The third predetermined time is also predetermined by means such as experimentation and may be, for example, from 3 to 10 seconds. The third pressing force may be set greater than the first pressing force.

During this step, since both the pin 11 and shoulder 12 make no advancement or withdrawal movement, "preheating" of the front surface 60c of the stack of the workpieces 60 is effected by the pin 11 and shoulder 12. Thus, the metal material in that region of the metal plate 61 which is in contact with the pin 11 and shoulder 12 is heated by friction and softened to form a plastic flow portion 60a in the vicinity of the front surface 60c of the stack of the workpieces 60.

Subsequently, the controller 51 controls the advancement/withdrawal actuator 53 to cause the pin 11 or shoulder 12 to perform predetermined actions (step S105), after which the controller 51 ends the program. Specifically, the controller 51 controls the advancement/withdrawal actuator 53 according to a predetermined control program stored in the storage 31.

This control of the advancement/withdrawal actuator 53 by the controller 51 is preferably carried out in such a manner that the absolute value of a tool average location Tx is small. Denoting the area of the distal end surface of the pin 11 by Ap, the area of the distal end surface of the shoulder 12 by As, the plunge depth of the pin 11 by Pp, and the plunge depth of the shoulder 12 by Ps, the tool average location Tx is defined by the following equation (I).

$$Ap \cdot Pp + As \cdot Ps = Tx \quad (I)$$

The control of the advancement/withdrawal actuator 53 is more preferably carried out in such a manner that the tool average location Tx is zero. The details of the control for achieving a small absolute value of the tool average location Tx are disclosed in Japanese Laid-Open Patent Application Publication No. 2012-196682 and will therefore not be described herein.

The controller 51 controls the advancement/withdrawal actuator 53 to withdraw the pin 11 from the front surface 60c of the stack of the workpieces 60 and cause the shoulder 12 to penetrate (plunge) into the stack of the workpieces 60 from the front surface 60c (see step (D1) of FIG. 4B).

Specifically, the controller 51 drives the pin actuator 531 to cause the pin 11 to move away from the workpieces 60 or drives the shoulder actuator 532 to cause the shoulder 12 to move toward the workpieces 60.

These movements lead to the softened portion of the metal material being extended from the upper metal plate 61 to the lower metal plate 62, resulting in an increase in volume of the plastic flow portion 60a. Further, the softened metal material in the plastic flow portion 60a is pushed away by the shoulder 12 and flows from a region directly below the shoulder 12 to a region directly below the pin 11, with the result that the pin 11 is withdrawn and lifted relative to the shoulder 12.

Subsequently, the controller 51 drives the pin actuator 531 to cause the pin 11 to move toward the workpieces 60 or drives the shoulder actuator 532 to cause the shoulder 12 to move away from the workpieces 60. Thus, the pin 11 is advanced toward the metal plate 61, while the shoulder 12 is withdrawn from the metal plate 61 (see step (D2) of FIG. 4C). Step (D2) need not be carried out if satisfactory reshaping of the front surface 60c of the metal plate 61 can be achieved by step (3) described later.

When proceeding from step (D1) to step (D2) and then to step (3), the controller 51 controls the advancement/withdrawal actuator 53 to retract the pin 11 slowly. It should be noted that during retraction movements of the pin 11 and shoulder 12, the welding pressures exerted by the distal ends of the pin 11 and shoulder 12 are maintained (see the arrows F in step (D1) of FIG. 4B and the arrows F in step (D2) of FIG. 4C).

Thus, when the shoulder 12 is retracted, the rotation and pressing pressure of the pin 11 are maintained, so that the softened metal material in the plastic flow portion 60a flows from the region directly below the pin 11 to the region directly below the shoulder 12 (a depression formed by plunging of the shoulder 12).

When the pin 11 is retracted, the rotation and pressing pressure of the shoulder 12 are maintained, so that the softened metal material in the plastic flow portion 60a flows from the region directly below the shoulder 12 to the region directly below the pin 11 (a depression formed by plunging of the pin 11).

Next, the controller 51 controls the advancement/withdrawal actuator 53 to place the pin 11 and shoulder 12 in a position where there is no or little level difference between the distal end surfaces 11a and 12a, namely where the distal end surfaces 11a and 12a are flush with each other (see step (3) of FIG. 4C). In consequence, the front surface 60c of the stack of the workpieces 60 is reshaped into a generally flat surface substantially free of any depression.

Subsequently, the controller 51 controls the advancement/withdrawal actuator 53 to move the pin 11, shoulder 12, and clamp 13 away from the workpieces 60 and then controls the rotary actuator 57 to stop the rotation of the pin 11 and shoulder 12, thereby ending the series of friction stir spot welding steps, namely the steps of welding the workpieces 60 (see step (4) of FIG. 4C). Thus, the metal plates 61 and 62 are released from the rotational force (and pressing force) exerted by the pin 11 and shoulder 12 contacting with the metal plates 61 and 62, and the plastic flow portion 60a extending over both of the metal plates 61 and 62 ceases the plastic flow and forms into a weld 60b.

In the above manner, the two metal plates 61 and 62 are joined (welded) at the weld 60b. The sealant 63 cures after a given period of time, and thus the welded surfaces of the metal plates 61 and 62 are sealed by the cured sealant 63.

In the friction stir spot welder 50 according to Embodiment 1, as described above, the controller 51 is configured to drive the rotary actuator 57 and advancement/withdrawal actuator 53 to cause the pin 11 to press the front surface 60c of the stack of the workpieces 60 while rotating (step (B)). The pressing with rotation generates friction heat between the distal end surface 11a of the pin 11 and the workpieces 60. Transfer of the generated friction heat leads to heating of that portion (and its vicinity) of the sealant 63 which overlaps the distal end surface 11a of the pin 11 when viewed in the vertical direction, thus decreasing the viscosity of the overlapping portion and its vicinity of the sealant 63.

In consequence, the portion (and its vicinity) of the sealant 63 which overlaps the distal end surface 11a of the pin 11 when viewed in the vertical direction is pushed outward from the initial location, and part of the sealant 63 comes out of the periphery of the stack of the workpieces 60.

As such, when the plastic flow portion 60a is formed by rotation of the pin 11 and shoulder 12, entry (mixing) of the sealant 63 into the plastic flow portion 60a can be reduced, and consequently high weld quality can be achieved.

With the use of the friction stir spot welder 50 according to Embodiment 1, adhesion of the sealant 63 to the pin 11 can be reduced since entry (mixing) of the sealant 63 into the plastic flow portion 60a can be reduced. Thus, when welding of workpieces 60 is performed in succession, the distal end surface 11a of the pin 11 can reliably press the front surface 60c of the stack of the workpieces 60. Additionally, adhesion of the sealant 63 to the front surface 60c of the stack of the workpieces 60 can be reduced, and this also contributes to achieving high weld quality.

Further, in the friction stir spot welder 50 according to Embodiment 1, the controller 51 is configured to drive the rotary actuator 57 and advancement/withdrawal actuator 53 to cause the pin 11 and shoulder 12 to press the front surface 60c of the stack of the workpieces 60 while rotating (step (C)). The pressing with rotation generates friction heat between the workpieces 60 and the distal end surfaces 11a and 12a of the pin 11 and shoulder 12. Transfer of the generated friction heat leads to heating of that portion (and its vicinity) of the sealant 63 which overlaps the distal end surfaces 11a and 12a of the pin 11 and shoulder 12 when viewed in the vertical direction, thus decreasing the viscosity of the overlapping portion and its vicinity of the sealant 63.

In consequence, the portion (and its vicinity) of the sealant 63 which overlaps the distal end surfaces 11a and 12a of the pin 11 and shoulder 12 when viewed in the vertical direction is pushed outward from the initial location, and part of the sealant 63 comes out of the periphery of the stack of the workpieces 60. The part of the sealant 63 remains around the periphery of the stack of the workpieces 60 and seals the welded surfaces of the workpieces 60.

As such, when the plastic flow portion 60a is formed by rotation of the pin 11 and shoulder 12, entry (mixing) of the sealant 63 into the plastic flow portion 60a can be reduced, and consequently high weld quality can be achieved.

With the use of the friction stir spot welder 50 according to Embodiment 1, adhesion of the sealant 63 to the pin 11 and/or shoulder 12 can be reduced since entry (mixing) of the sealant 63 into the plastic flow portion 60a can be reduced. Thus, when welding of workpieces 60 is performed in succession, the distal end surface of the pin 11 and/or the distal end surface of the shoulder 12 can reliably press the front surface 60c of the stack of the workpieces 60. Additionally, adhesion of the sealant 63 to the front surface 60c of the stack of the workpieces 60 can be reduced, and this also contributes to achieving high weld quality.

In the friction stir spot welder 50 according to Embodiment 1, the controller 51 is configured to control the rotary actuator 57 and advancement/withdrawal actuator 53 to first cause the pin 11 to press the workpieces 60 while rotating and then cause the pin 11 and shoulder 12 to press the workpieces 60 while rotating. However, the controller 51 is not limited to this configuration.

The controller 51 may be configured to drive the rotary actuator 57 and advancement/withdrawal actuator 53 to, from the first, cause the pin 11 and shoulder 12 to press the workpieces 60 while rotating.

Embodiment 2

A friction stir spot welder according to Embodiment 2 is based on the friction stir spot welder according to Embodiment 1, and the controller in Embodiment 2 is configured to, in step (D): (D1) drive the rotary actuator and advancement/withdrawal actuator to cause the pin to plunge into the weld region while rotating; and (D2) after the plunging (D1), drive the rotary actuator and advancement/withdrawal actuator to retract the pin out of the weld region and cause the shoulder to plunge into the weld region while rotating.

Hereinafter, an example of the friction stir spot welder according to Embodiment 2 will be described in detail with reference to the drawings. The basic configuration of the friction stir spot welder according to Embodiment 2 is the same as that of the friction stir spot welder according to Embodiment 1 and will therefore not be described below.

Operation (Operating Method) of Friction Stir Spot Welder

Figure 5A:
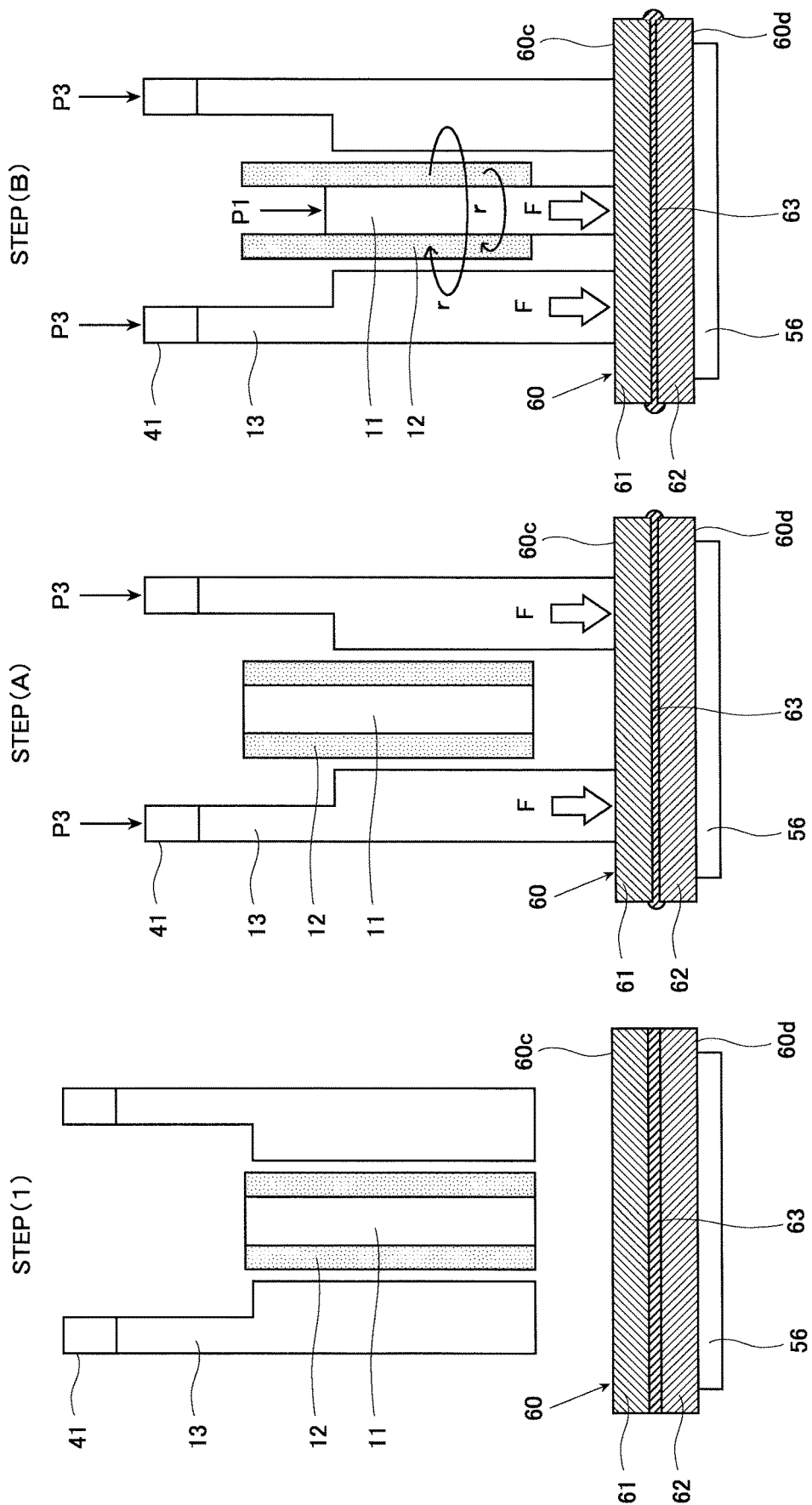
FIG. 5A is a process diagram schematically illustrating examples of the steps of friction stir spot welding performed by a friction stir spot welder according to Embodiment 2.
Figure 5B:
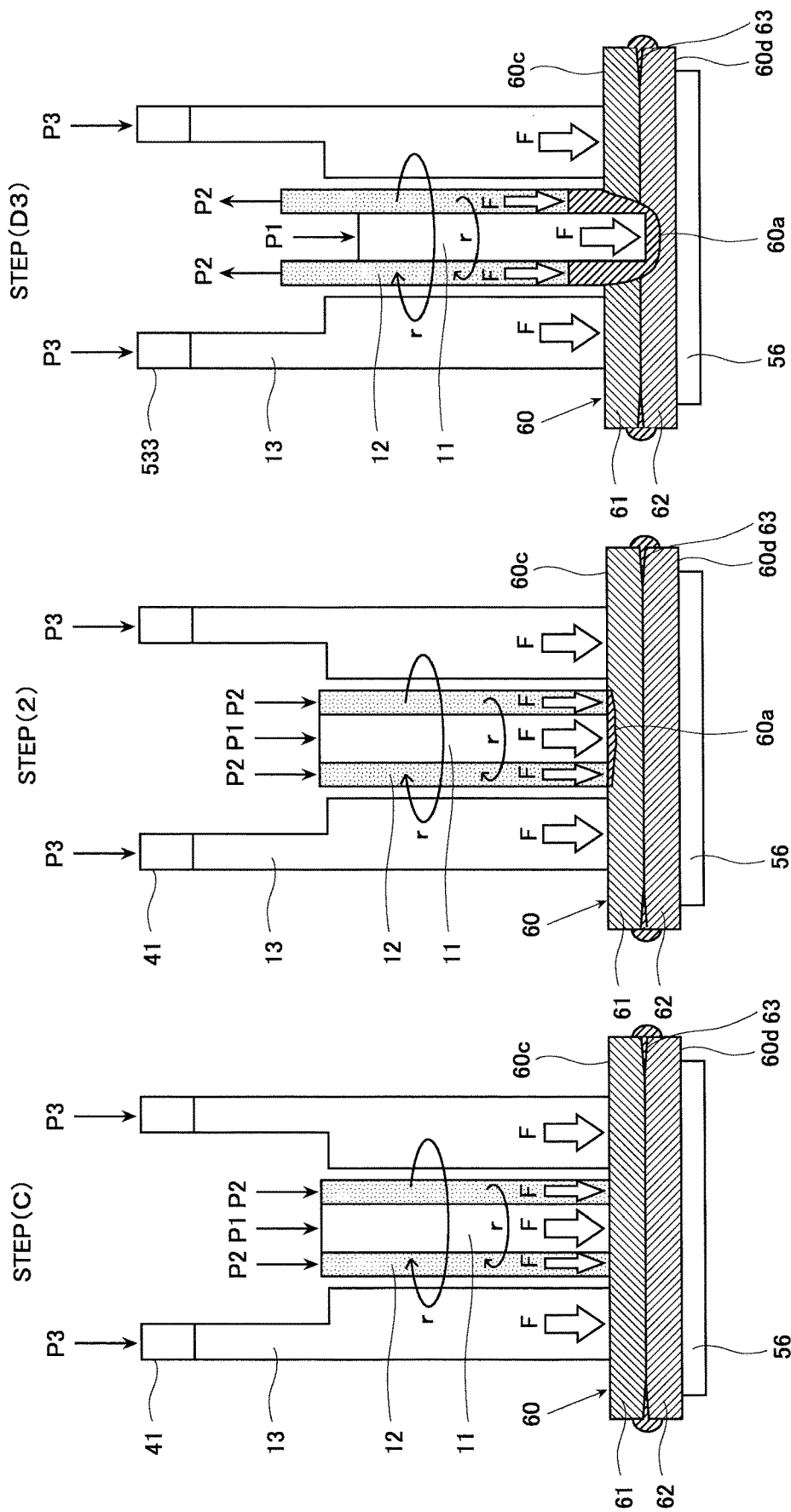
FIG. 5B is a process diagram schematically illustrating examples of the steps of the friction stir spot welding performed by the friction stir spot welder according to Embodiment 2.
Figure 5C:
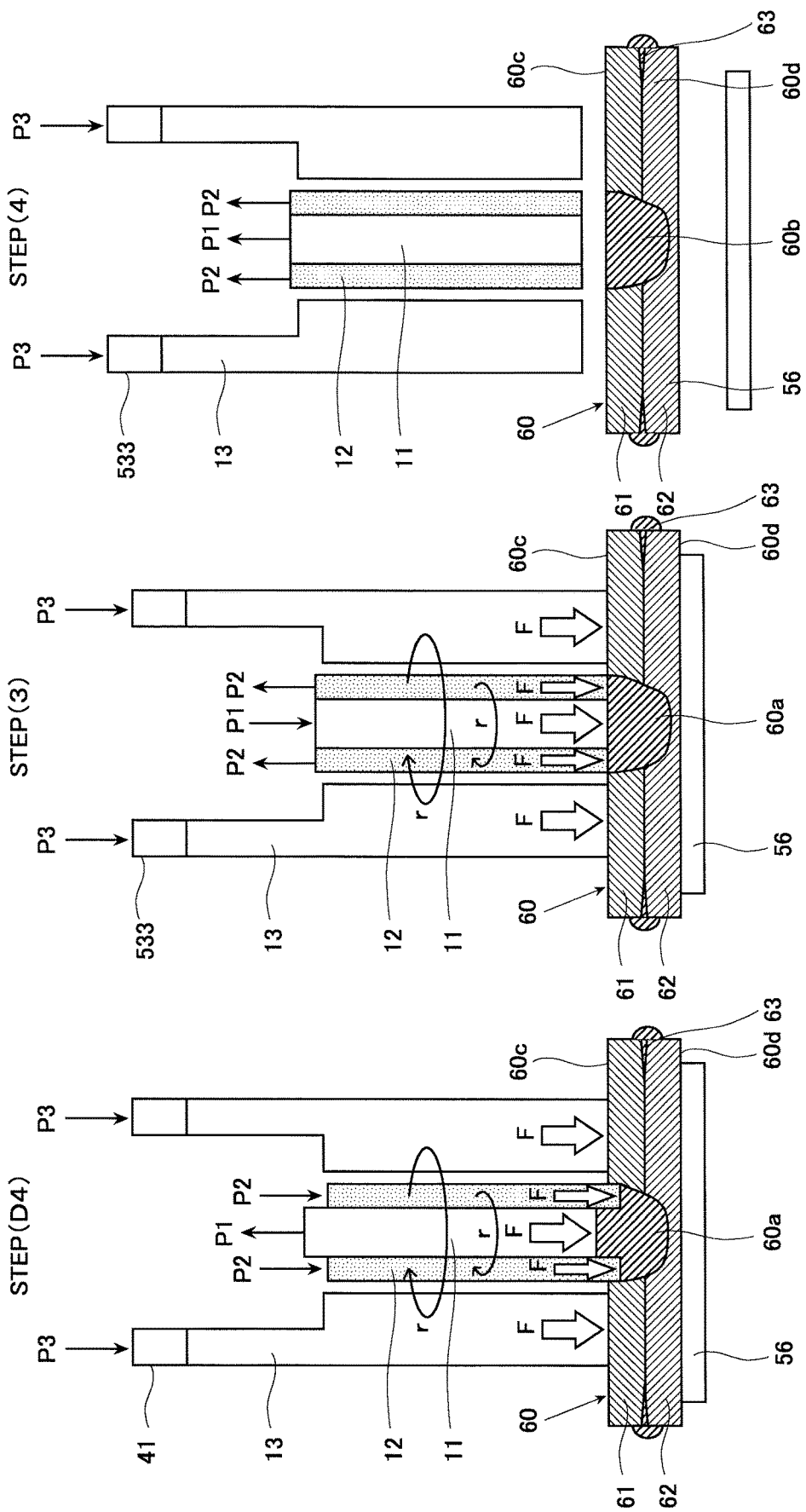
FIG. 5C is a process diagram schematically illustrating examples of the steps of the friction stir spot welding performed by the friction stir spot welder according to Embodiment 2.

FIGS. 5A, 5B, and 5C are process diagrams schematically illustrating examples of the steps of friction stir spot welding performed by the friction stir spot welder according to Embodiment 2.

In FIGS. 5A, 5B, and 5C, some parts of the friction stir spot welder are omitted. The arrows r indicate the rotational directions of the pin 11 and shoulder 12, and the block arrows F indicate the directions of the forces exerted on the metal plates 61 and 62. Although a force is exerted on the metal plates 61 and 62 also from the backing 56, the force from the backing 56 is omitted in FIGS. 5A, 5B, and 5C for convenience of illustration. To clearly distinguish between the pin 11 and the clamp 13, the shoulder 12 is shaded.

As seen from FIGS. 5A to 5C, the operation of the friction stir spot welder 50 according to Embodiment 2 is basically the same as that of the friction stir spot welder 50 according to Embodiment 1, and differs in that steps (D3) and step (D4) are performed instead of steps (D1) and (D2).

Specifically, after step (2), the controller 51 drives the pin actuator 531 to cause the pin 11 to move toward the workpieces 60 or drives the shoulder actuator 532 to cause the shoulder 12 to move away from the workpieces 60 (step (D3) of FIG. 5B). Thus, the pin 11 is advanced toward the metal plate 61, while the shoulder 12 is withdrawn from the metal plate 61.

These movements lead to the softened portion of the metal material being extended from the upper metal plate 61 to the lower metal plate 62, resulting in an increase in volume of the plastic flow portion 60a. Further, the softened metal material in the plastic flow portion 60a is pushed away by the pin 11 and flows from a region directly below the pin 11 to a region directly below the shoulder 12, with the result that the shoulder 12 is withdrawn and lifted relative to the pin 11.

Subsequently, the controller 51 drives the pin actuator 531 to cause the pin 11 to move away from the workpieces 60 or drives the shoulder actuator 532 to cause the shoulder 12 to move toward the workpieces 60 (step (D4) of FIG. 5C). Thus, the shoulder 12 is advanced toward the metal plate 61, while the pin 11 is withdrawn from the metal plate 61. During these movements, the softened metal material in the plastic flow portion 60a flows from the region directly below the pin 11 to the region directly below the shoulder 12 (a depression formed by plunging of the shoulder 12).

Next, the controller 51 controls the advancement/withdrawal actuator 53 to place the pin 11 and shoulder 12 in a position where there is no or little level difference between the distal end surfaces 11a and 12a (see step (3) of FIG. 5C).

After that, the controller 51 controls the advancement/withdrawal actuator 53 to move the pin 11, shoulder 12, and clamp 13 away from the workpieces 60 and then controls the rotary actuator 57 to stop the rotation of the pin 11 and shoulder 12 (see step (4) of FIG. 5C), thereby ending the program.

The friction stir spot welder 50 according to Embodiment 2, which is configured as described above, can offer the same benefits as the friction stir spot welder 50 according to Embodiment 1.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention. The invention can be implemented in various forms by appropriately combining the constituting elements disclosed in the embodiments described above.

INDUSTRIAL APPLICABILITY

The friction stir spot welder and operating method thereof according to the present invention are capable of achieving high weld quality even when used to weld workpieces in the presence of a sealant applied between the workpieces, and are therefore useful.

REFERENCE SIGNS LIST 11 pin
11a distal end surface
12 shoulder
12a distal end surface
13 clamp
13a distal end surface
31 storage
32 input receiver
41 clamp actuator
50 friction stir spot welder
51 controller
52 tool holder
53 advancement/withdrawal actuator
55 support
56 backing
56a support surface
57 rotary actuator
60 workpiece
60a plastic flow portion
60b weld
60c front surface
61 metal plate
62 metal plate
63 sealant
521 rotary tool holder
522 clamp holder
531 pin actuator
532 shoulder actuator
Xr axis

The invention claimed is:

1. A friction stir spot welder adapted to weld workpieces through softening induced by friction heat, the workpieces including first and second workpieces stacked in the presence of a sealant applied to a region of contact between the first and second workpieces, the friction stir spot welder comprising:

a pin in the form of a solid circular cylinder;
a shoulder in the form of a hollow circular cylinder, the shoulder having an interior in which the pin is inserted;
a rotary actuator that rotates the pin and the shoulder about an axis coinciding with a central axis of the pin;
a clamp in the form of a hollow circular cylinder, the clamp having an interior in which the pin and the shoulder are inserted;
an advancement/withdrawal actuator that advances and withdraws the pin, the shoulder, and the clamp along the axis; and
a controller, the controller being configured to:

(B) drive the rotary actuator and the advancement/withdrawal actuator to cause the pin to press the workpieces for a first predetermined time while rotating;
(C) after performing the pressing (B), drive the rotary actuator and the advancement/withdrawal actuator to cause the pin and the shoulder to press the workpieces for a second predetermined time while rotating; and
(D) after performing the pressing (C), drive the rotary actuator and the advancement/withdrawal actuator to cause the pin and/or the shoulder to plunge into a weld region of the workpieces while rotating and stir the weld region to weld the workpieces together.

2. The friction stir spot welder according to claim 1, wherein the controller is configured to, in the plunging (D):
(D1) drive the rotary actuator and the advancement/withdrawal actuator to cause the pin to plunge into the weld region while rotating; and
(D2) after the plunging (D1), drive the rotary actuator and the advancement/withdrawal actuator to retract the pin out of the weld region and cause the shoulder to plunge into the weld region while rotating.

3. The friction stir spot welder according to claim 1, wherein the controller is configured to, in the plunging (D):
(D3) drive the rotary actuator and the advancement/withdrawal actuator to cause the shoulder to plunge into the weld region while rotating; and
(D4) after the plunging (D3), drive the rotary actuator and the advancement/withdrawal actuator to retract the shoulder out of the weld region and cause the pin to plunge into the weld region while rotating.

4. The friction stir spot welder according to claim 1, wherein the controller is configured to, in the pressing (B), control the advancement/withdrawal actuator to place a distal end of the pin on an upper surface of the stack of the workpieces.

5. The friction stir spot welder according to claim 1, wherein the controller is configured to, in the pressing (C), control the advancement/withdrawal actuator to place respective distal ends of the pin and the shoulder on an upper surface of the stack of the workpieces.

6. A method of operating a friction stir spot welder adapted to weld workpieces through softening induced by friction heat, the workpieces including first and second workpieces stacked in the presence of a sealant applied to a region of contact between the first and second workpieces, wherein the friction stir spot welder includes: a pin in the form of a solid circular cylinder; a shoulder in the form of a hollow circular cylinder, the shoulder having an interior in which the pin is inserted; a rotary actuator that rotates the pin and the shoulder about an axis coinciding with a central axis of the pin; a clamp in the form of a hollow circular cylinder, the clamp having an interior in which the pin and the shoulder are inserted; and an advancement/withdrawal actuator that advances and withdraws the pin, the shoulder, and the clamp along the axis, the method comprising:
(B) driving the rotary actuator and the advancement/withdrawal actuator to cause the pin to press the workpieces for a first predetermined time while rotating;
(C) after performing the pressing (B), driving the rotary actuator and the advancement/withdrawal actuator to cause the pin and the shoulder to press the workpieces for a second predetermined time while rotating; and
(D) after performing the pressing (C), driving the rotary actuator and the advancement/withdrawal actuator to cause the pin and/or the shoulder to plunge into a weld region of the workpieces while rotating and stir the weld region to weld the workpieces together.

7. The method according to claim 6, wherein the plunging (D) includes:
(D1) driving the rotary actuator and the advancement/withdrawal actuator to cause the pin to plunge into the weld region while rotating; and
(D2) after the plunging (D1), driving the rotary actuator and the advancement/withdrawal actuator to retract the pin out of the weld region and cause the shoulder to plunge into the weld region while rotating.

8. The method according to claim 6, wherein the plunging (D) includes:
(D3) driving the rotary actuator and the advancement/withdrawal actuator to cause the shoulder to plunge into the weld region while rotating; and
(D4) after the plunging (D3), driving the rotary actuator and the advancement/withdrawal actuator to retract the shoulder out of the weld region and cause the pin to plunge into the weld region while rotating.

9. The method according to claim 6, wherein in the pressing (B), the advancement/withdrawal actuator is operated to place a distal end of the pin on an upper surface of the stack of the workpieces.

10. The method according to claim 6, wherein in the pressing (C), the advancement/withdrawal actuator is operated to place respective distal ends of the pin and the shoulder on an upper surface of the stack of the workpieces.

* * * * *